(12) United States Patent
Gordon et al.

(10) Patent No.: US 7,595,929 B1
(45) Date of Patent: Sep. 29, 2009

(54) GROOVED BACKSIDE ACOUSTIC TERMINATION OF ACOUSTO-OPTIC DEVICES

(75) Inventors: Leslie Gordon, Palo Alto, CA (US); Ronald Charles Dwelle, Sunnyvale, CA (US); Jon Fowler, Sunnyvale, CA (US)

(73) Assignee: Crystal Technology, Inc., Palo Alto, CA (US)

( * ) Notice: Subject to any disclaimer, the term of this patent is extended or adjusted under 35 U.S.C. 154(b) by 0 days.

(21) Appl. No.: 11/809,295

(22) Filed: May 30, 2007

Related U.S. Application Data

(60) Provisional application No. 60/803,498, filed on May 30, 2006.

(51) Int. Cl.
*G02F 1/33* (2006.01)

(52) U.S. Cl. ...................................................... 359/305

(58) Field of Classification Search ......... 359/305–320, 359/348, 754, 769
See application file for complete search history.

(56) References Cited

U.S. PATENT DOCUMENTS

| | | | |
|---|---|---|---|
| 3,955,159 A | | 5/1976 | Mitchell et al. |
| 4,512,638 A | * | 4/1985 | Sriram et al. ............... 359/352 |
| 4,582,397 A | | 4/1986 | Chang |
| 5,097,512 A | | 3/1992 | Batey |
| 7,054,055 B2 | * | 5/2006 | Shibuya et al. .............. 359/305 |

\* cited by examiner

*Primary Examiner*—Scott J Sugarman
*Assistant Examiner*—Vipin M Patel
(74) *Attorney, Agent, or Firm*—Goodwin Procter LLP; Paul Davis

(57) ABSTRACT

An acousto-optic device having at least one groove on the backside improves acoustic termination of the device. The grooves can be added early in device fabrication and are compatible with batch processing, thereby avoiding the separate device handling. Grooving can be performed on the cell, before it is mounted to a batch plate. This simplifies batch plate processing by using a backside that remains parallel to the bondface.

13 Claims, 4 Drawing Sheets

GROOVED BACKSIDE ACOUSTIC TERMINATION OF ACOUSTO-OPTIC DEVICES

RELATED APPLICATION

This application claims the benefit of U.S. Provisional Patent Application Ser. No. 60/803,498 filed May 30, 2006.

BACKGROUND OF THE INVENTION

1. Field of the Invention

This invention relates to acousto-optic devices, and more particularly to acousto-optic devices having acoustic termination structures amenable to batch processing.

2. Description of Prior Art

All acousto-optic devices require some form of acoustic termination. Without termination, the acoustic energy is reflected back toward the transducer, creating interference with the acoustic wave being generated by the same transducer. The worst case is for a polished surface parallel to the transducer surface. In this case, almost all the acoustic wave is reflected directly back to the transducer.

FIG. 1 illustrates an acousto-optic device, interference, and acoustic termination. An optical beam (12) enters one window (14) and travels through the substrate (i.e. the crystal used to fabricate the device), exiting through a second window (16). Both windows are coated with an optical antireflection coating to maximize insertion and minimize reflection in the substrate. In most standard modulators, the acoustic wave (18) travels orthogonal to the optical beam (12). The acoustic wave generated by transducer (20) at bond face (22) interacts with the optical wave, deflecting it (20). For the device to function optimally, the acoustic wave must be attenuated and prevented from interacting multiple times with the optical wave, or returning to the transducer to interfere with the acoustic waves being generated there.

There are four ways to prevent an acoustic wave from reflecting off the backside and returning to the bond face: (a) absorb the wave on the backside surface; (b) transmit the wave through the backside surface; (c) scatter the wave; and (d) reflect the wave in another direction. These techniques can be explained by comparison with their more commonly understood optical counterparts. When an optical wave strikes a black matte surface, very little light is reflected off. With the acoustic equivalent of a black matte surface, there is a very low reflection of the acoustic wave. We have tried dense glues, platinum paint, and tungsten imbedded epoxy for acoustic termination. This technique has the advantage of a liquid staring material that is easily applied without any grinding or mounting step. The disadvantage is out-gassing due to the liquid form. While some improvement was measured, the results were not consistent. Acoustic transmission through the backside is equivalent to an optical antireflection coating. The difficulty is in developing good coatings and very accurate deposition and measurement techniques.

All surfaces, even polished, will scatter an acoustic wave somewhat. A rougher surface will scatter more. Ideally, a surface could be made arbitrarily rough to produce the required termination level. However, the rougher the surface, the more susceptible the substrate is to cracking and chipping, reducing device yields. Rougher surfaces are also more difficult to clean, affecting yields.

Backside angles are the most direct way to significantly reduce the acoustic wave reflection. Single or compound angles may be used for acoustic termination. A single angle can either have the angle between the windows (in the direction of optical propagation) or perpendicular to the direction of optical propagation. A compound angle has an angle both in and perpendicular to the direction of optical propagation. See FIG. 2. We have found a compound angle to be more effective. Some standard modulator angles are 7°×26°, and 7°×40°. For these angles, termination levels of 40-60 dB are commonly measured. We have found that 38 dB is a minimum termination level for good device performance. Backside angles are commonly combined with some backside roughening. Current devices employ a ground surface at a compound angle on the backside to both reflect away and scatter the incident acoustic wave. The compound angle is very effective at removing the acoustic interference; however, the angle is ground as one of the final fabrication steps, and must be done individually for each device. This is a major disadvantage when processing large numbers of devices, since it requires separate handling and mounting of each device.

Angled devices are manufactured by slicing a crystal of the desired size from its cell, then wax mounting the crystal on the transducer surface on a compound angle backside grinding fixture. The electrode and/or transducer can be damaged during this step, and each device must be carefully mounted one after another onto the backside grinding fixture. If the amount of wax is not adequate, the devices can be pulled off during the grinding and damaged. After grinding, the fixture is heated again to demount the devices, and the devices are soaked for many hours in a solvent to remove the wax. While this process is adequate for lower volume products, it is a bottle neck for larger volumes.

SUMMARY OF THE INVENTION

The present invention is an acousto-optic device having at least one groove on the backside to improve acoustic termination of the device. The grooves can be added early in device fabrication and are compatible with batch processing, thereby avoiding the separate device handling required by prior art methods. The invention avoids the complexity of prior art acoustic termination of acousto-optic devices. Processing can be performed on the cell, before it is mounted to a batch plate (the mounting fixture which allows two or more cells to be attached and run as one unit from bond face polish through device dice). The prior art method of putting an angle on the cells before mounting requires a batch plate with a position for each cell having the same angle in order to produce a flat bondface of the same crystal orientation for all the cells. Since the batch plate is single-use only (it is cut up during the final dice), even a single rather than a compound angle requires very accurate and expensive custom batch plates. The present invention simplifies batch plate processing by using a backside that remains parallel to the bondface.

DETAILED DESCRIPTION OF THE INVENTION

The present invention uses at least one groove in the backside of each cell. The groove(s) can be cut either directly after the cells are sliced from the boule, or after the windows had been AR coated. The groove(s) are cut using a crystal milling machine. For small cells a groove can be formed down the center of the backside of the device. The electrode, and therefore the acoustic wave, does not cover the entire optical length of the device. On most common modulators, the electrode is less than one third of the optical length. The acoustic termination only needs to disperse the width of the acoustic wave. Therefore, approximately two-thirds of the backside remains parallel for mounting.

If desired, the backside can be roughened by grinding, although this may not be necessary because of the effectiveness of grooving for acoustic termination. Roughening is simplified using the present invention because the bondface and backside face of the device are parallel except for the grooves.

Acoustic Termination Measurements

Figure 1:
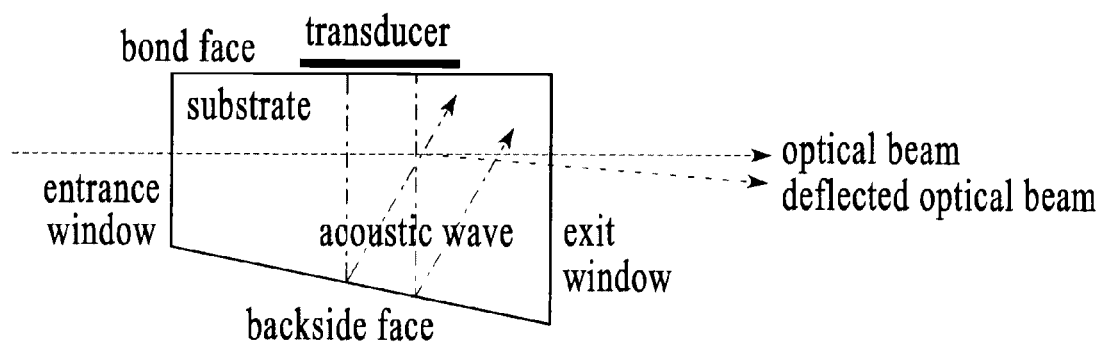
FIG. 1 illustrates an acousto-optic device, interference and acoustic termination.
Figure 2:
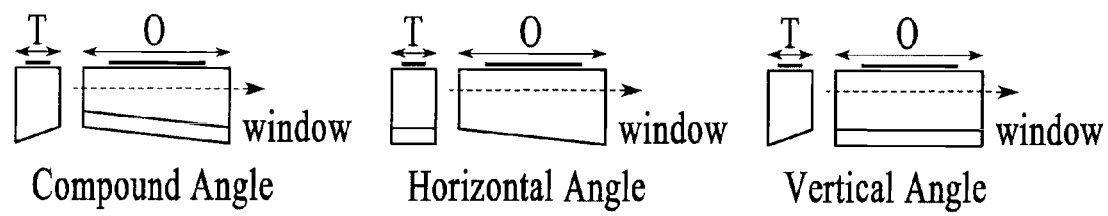
FIG. 2 shows compound and single angle devices.
Figure 3:
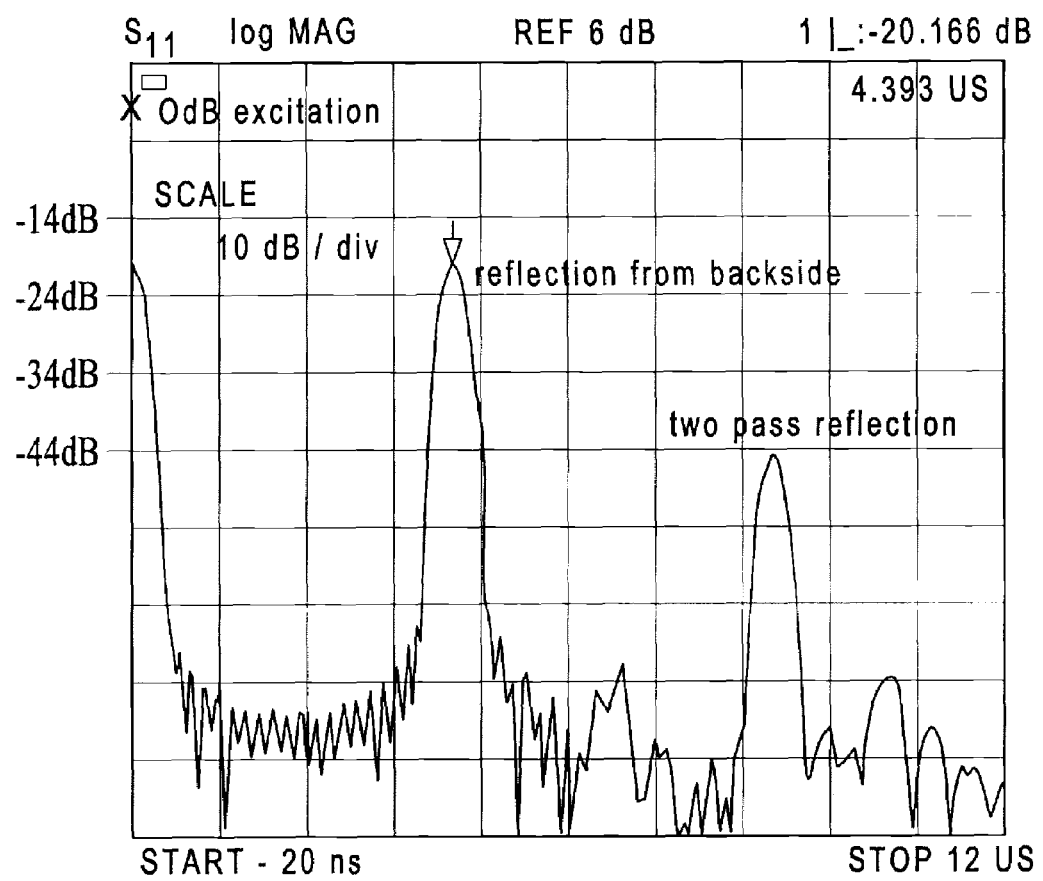
FIG. 3 shows time domain response to an impulse excitation of a device with a polished, parallel acoustic backside.

The degree of reduction of the acoustic wave is measured indirectly using an Agilent Network Analyzer, 8753ES. This instrument measures the complex impedance $S_{11}$ of the two-terminal transducer as a function of frequency. A Fourier transformation of this measurement then yields the delay and magnitude of the response to a short excitation pulse in the time domain. The result of such a measurement for a polished, parallel acoustic backside is shown in FIG. 3. A high frequency pulse is applied to the device, and the reflection at time 0 is due to the acoustic reflection at the transducer/crystal interface. A poorly matched transducer can have an initial peak as high as −10 dB, corresponding to only 90% of power coupled into the device. The example shown has good impedance matching, initial peak height of −21 dB, with over 99% coupled into the device. Most of the energy is converted into an acoustic pulse and travels through the substrate to the backside where it is scattered, reflected and adsorbed. A portion of the acoustic pulse will be reflected back to the transducer, where it will excite a vibration in the transducer, creating an electrical signal for the network analyzer.

The magnitude of the electrical response ($P_2$) to the excitation signal ($P_1$) depends on the electrical to acoustic coupling efficiency (k), and the acoustic reflection at the backside (r). For simplification, assume that the electrical to acoustic and the acoustic to electrical couplings are the same, and therefore an acoustic pulse going into the substrate, reflecting off the backside, and coming out of the substrate will be coupled twice.

$$P_2 = P_1 \times (k)^2 \times r \quad (1)$$

The network analyzer measures the attenuation $\kappa = 10 \log(P_2/P_1) = 10 \log(k^2 r)$. For these samples, we have assumed that k is similar from sample to sample, and close enough to 1 that we can compare κ directly.

The better the acoustic termination, the more negative the attenuation will be. In the example shown in FIG. 3, κ=−20.2 dB. Because this device had a parallel backside with a smooth surface, reflection r is quite large, allowing not just one, but two reflections as seen by the third peak at 8.8 μs.

All samples were measured at 350 MHz, with a frequency bandwidth of 5 MHz. The delays between the reflection off the transducer and the backside reflection were between 3.9 and 4.3 μs. The tabulated numbers represent the attenuation K of the second peak after reflection from the backside. These numbers do not absolutely measure the backside reflection, but are a good relative measure of the effectiveness of the acoustic termination approach.

Acoustic Termination Experimental Results

Samples were prepared with parallel rough backsides. The cells were wax mounted to a plate to ensure parallelism, before grinding. The results are shown in Table 1.

TABLE 1

Parallel Rough Backsides (measured at 350 MHz, with 5 MHz span at 5 μs)

| part # | electrode length (mm) | cell # | device # | first pass RF attenuation (dB) |
|---|---|---|---|---|
| 82-02892-01 | 1.15 | ZP2 | A | −67 |
| | | ZP2 | B | −41 |
| | | ZP2 | F | −44 |
| | | ZR5 | C | −20 |
| | | ZR5 | D | −25 |
| | | ZR5 | E | −20 |
| | | ZR5 | G | −20 |
| | | ZO9 | | −33 |
| | | no ID | | −50 |
| 82-02892-02 | 1.50 | ZQ9 | A | −20 |
| | | ZQ9 | B | −24 |
| | | ZQ9 | C | −20 |
| | | ZQ9 | D | −22 |
| | | ZQ9 | E | −23 |
| | | ZQ9 | F | −20 |
| | | ZR6 | G | −19 |

Figure 4:
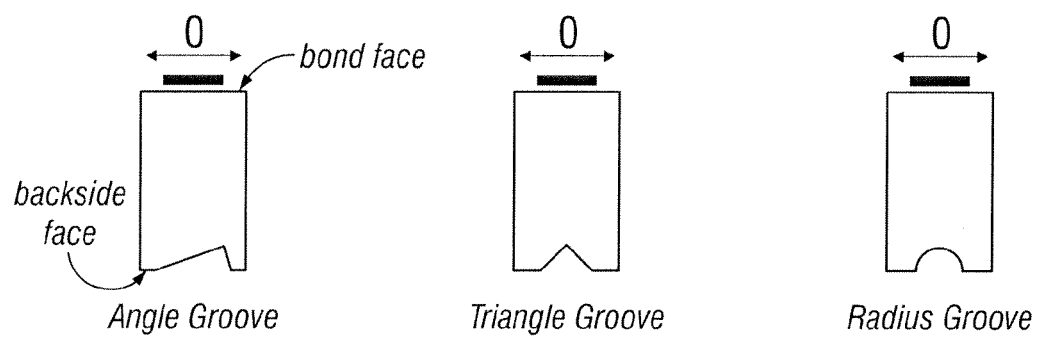
FIG. 4 shows acousto-optic devices having grooved backside acoustic termination.

Five types of grooving were tested: 2 angles at 3° and 9°, a dual angle (triangle), and two styles of radial grooves. The grooves were 0.08" wide to ensure coverage of an electrode 0.06" wide. See FIG. 4.

Two devices were tested for each of the different grooved cells. The attenuation results are presented in Table 2. While all of the groove types have consistently better attenuation than the parallel rough backsides, the best results are for the single angles. The better results for the single angle grooves is probably due to the elimination of all surfaces parallel to the transducer in the grooved area. Due to the radius of curvature of the tool, even the triangular tool will have a small area in the center where the tool is rounded.

TABLE 2

Grooved Backsides

| part # | groove style | cell# | device # | first pass RF attenuation (dB) |
|---|---|---|---|---|
| 82-02892-03 | angle 3° | ZQ4 | 1 | −40.7 |
| | | | 2 | −42.1 |
| | angle 9° | ZQ0 | 1 | −46 |
| | | | 2 | −46.7 |
| | triangle | ZQ7 | 1 | −32 |
| | | | 2 | −29.8 |
| | large radius | ZR0 | 1 | −37.1 |
| | | | 2 | −33.9 |
| | half circle | ZR4 | 1 | −36 |
| | | | 2 | −37.5 |

Angled grooves produce attenuation levels of −40 to −46 dB, can be grooved early in fabrication, are compatible with batch plate processing, and avoid the separate device handling that is required for a compound backside angle. Table 3 compares the backside grind and backside grooving processes. A step has been added in the cell form that requires no window protection and little precision, replacing a final step which required protecting windows and acoustic faces, and handling of each device separately.

TABLE 3

Process Comparison: Backside Grind and Backside Groove

| Backside Grind Process | Backside Groove Process | Comments |
| --- | --- | --- |
| Slice | Slice | |
| | Backside Groove | in cell form; no polished surfaces, therefore no protection required |
| Window Polish | Window Polish | |
| AR Coat | AR Coat | |
| Batch Plate Mount | Batch Plate Mount | |
| Bondface Polish | Bondface Polish | |
| Transducer Reduction | Transducer Reduction | |
| Metallization | Metallization | |
| Device Dice | Device Dice | |
| Demount from Batch Plates | Demount from Batch Plates | |
| Backside Grind | | each device must be handled separately, 3 surfaces need to be protected |

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. An acousto-optic device comprising an acousto-optic crystal substrate having a bond face and a backside face, wherein the backside face is substantially parallel to the bond face and a portion of the backside face has at least one groove with a groove surface that is not substantially parallel to the bond face, the at least one groove being sized to provide an acoustic termination.

2. The device of claim 1, wherein the groove shape is selected from the group consisting of large radius, half circle, triangle, and angled.

3. The device of claim 2, wherein the groove shape is angled.

4. The device of claim 1, further comprising a transducer in acoustic contact with the bond face.

5. The device of claim 4, wherein a groove is positioned opposite the transducer.

6. The device of claim 5, wherein the groove has a width of at least 90% the width of the electrode.

7. The device of claim 4, wherein the groove shape is selected from the group consisting of large radius, half circle, triangle, and angled.

8. The device of claim 7, wherein the groove shape is angled.

9. The device of claim 7, wherein a groove is positioned opposite the transducer.

10. The device of claim 9, wherein the groove has a width at least 90% the width of the electrode.

11. An acousto-optic device comprising:
an acousto-optic crystal substrate having a bond face and a backside face, the backside face being substantially parallel to the bond face and a portion of the backside face having at least one groove that is not substantially parallel to the bond face;
a transducer in acoustic contact with the bond face; and
wherein an acoustic termination is at least 30 db.

12. An acousto-optic device comprising:
an acousto-optic crystal substrate having a bond face and a backside face, the backside face being substantially parallel to the bond face and a portion of the backside face having at least one groove with a groove surface that is not substantially parallel to the bond face;
a transducer in acoustic contact with the bond face; and
wherein an acoustic termination is at least 38 db.

13. An acousto-optic device comprising:
an acousto-optic crystal substrate having a bond face and a backside face, the backside face being substantially parallel to the bond face and a portion of the backside face having at least one groove with a groove surface that is not substantially parallel to the bond face, the groove having a shape selected from the group consisting of large radius, half circle, triangle, and angled;
a transducer in acoustic contact with the bond face; and
wherein an acoustic termination is at least 38 db.

* * * * *